(12) United States Patent
Kozuka et al.

(10) Patent No.: US 11,014,603 B2
(45) Date of Patent: May 25, 2021

(54) VEHICLE CONTROL APPARATUS

(71) Applicant: JTEKT CORPORATION, Osaka (JP)

(72) Inventors: Kenichi Kozuka, Chita (JP); Masato Oda, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 158 days.

(21) Appl. No.: 16/407,657

(22) Filed: May 9, 2019

(65) Prior Publication Data

US 2019/0351940 A1    Nov. 21, 2019

(30) Foreign Application Priority Data

May 15, 2018    (JP) .............................. JP2018-093986

(51) Int. Cl.
    *B62D 5/04*    (2006.01)
(52) U.S. Cl.
    CPC ......... *B62D 5/0481* (2013.01); *B62D 5/0463* (2013.01)
(58) Field of Classification Search
    CPC .. B62D 5/0481; B62D 5/0463; B62D 15/021; B62D 5/0457
    See application file for complete search history.

(56) References Cited

U.S. PATENT DOCUMENTS

| | | | | |
|---|---|---|---|---|
| 5,360,077 A * | 11/1994 | Nishimoto | ........... | B62D 5/0478 180/446 |
| 2002/0053481 A1* | 5/2002 | Itakura | ................. | B62D 5/0463 180/446 |
| 2007/0282558 A1* | 12/2007 | Sagisaka | ................ | B62D 5/049 702/116 |
| 2008/0215913 A1* | 9/2008 | Terayama | ........... | G06F 11/0757 714/11 |
| 2009/0079435 A1* | 3/2009 | Nakata | .................. | H02M 3/156 324/500 |

(Continued)

FOREIGN PATENT DOCUMENTS

| | | |
|---|---|---|
| DE | 102012012996 A1 | 1/2013 |
| EP | 2282401 A1 | 2/2011 |

(Continued)

OTHER PUBLICATIONS

Jan. 27, 2020 Search Report issued in European Patent Application No. 19 17 4320.

*Primary Examiner* — Mussa A Shaawat
(74) *Attorney, Agent, or Firm* — Oliff PLC (57) ABSTRACT

An ECU of a vehicle controls a motor on the vehicle. The ECU includes a microcomputer and a monitoring circuit. The monitoring circuit includes a rotation detection circuit that detects the number of rotations of the motor at a preset sampling interval, a control circuit including a logic circuit that controls an operation of the rotation detection circuit, and an inspection circuit that inspects of the control circuit. The microcomputer is started upon start of vehicle power supply and performs a specific process using the number of rotations of the motor detected by the rotation detection circuit. The inspection circuit performs the inspection of the control circuit in the monitoring circuit in a period in which the microcomputer is kept in a reset state after the vehicle power supply is turned on and which is within a sampling interval of the rotation detection circuit in the monitoring circuit.

6 Claims, 4 Drawing Sheets

(56) References Cited

U.S. PATENT DOCUMENTS

| | | | |
|---|---|---|---|
| 2011/0035114 A1* | 2/2011 | Yoneda | H02P 6/185 |
| | | | 701/42 |
| 2011/0043323 A1* | 2/2011 | Hamasako | G05B 9/03 |
| | | | 340/3.43 |
| 2012/0273290 A1* | 11/2012 | Kawano | B62D 5/0487 |
| | | | 180/443 |
| 2013/0006474 A1* | 1/2013 | Pyo | B62D 5/049 |
| | | | 701/41 |
| 2014/0102219 A1* | 4/2014 | Kuwahara | B62D 5/0481 |
| | | | 73/862.333 |
| 2015/0046039 A1* | 2/2015 | Yamano | G01L 5/221 |
| | | | 701/41 |
| 2015/0175191 A1* | 6/2015 | Harada | B62D 15/0235 |
| | | | 701/41 |
| 2015/0220378 A1* | 8/2015 | Kanamaru | G06F 11/263 |
| | | | 714/37 |
| 2015/0239501 A1* | 8/2015 | Fujita | B62D 15/021 |
| | | | 701/41 |
| 2015/0353128 A1* | 12/2015 | Shibuya | B62D 5/001 |
| | | | 701/41 |
| 2015/0367887 A1* | 12/2015 | Fujita | B62D 15/021 |
| | | | 701/41 |
| 2016/0288823 A1* | 10/2016 | Mikamo | B62D 5/049 |
| 2017/0085205 A1* | 3/2017 | Koseki | B62D 3/123 |
| 2017/0183027 A1* | 6/2017 | Kimura | B62D 5/0463 |
| 2017/0291640 A1* | 10/2017 | Fujita | B62D 5/049 |
| 2018/0175779 A1* | 6/2018 | Koseki | H02P 29/028 |
| 2019/0092382 A1* | 3/2019 | Kogure | B62D 5/0481 |
| 2020/0039579 A1* | 2/2020 | Fujita | B62D 5/046 |
| 2020/0114961 A1* | 4/2020 | Suzuki | B62D 6/008 |
| 2020/0114967 A1* | 4/2020 | Nakajima | B60Q 9/00 |
| 2020/0207408 A1* | 7/2020 | Nakamura | B62D 5/049 |

FOREIGN PATENT DOCUMENTS

| | | |
|---|---|---|
| EP | 2450266 A1 | 5/2012 |
| EP | 2559985 A1 | 2/2013 |
| GB | 2368053 A | 4/2002 |
| JP | 2017-024556 A | 2/2017 |

* cited by examiner

VEHICLE CONTROL APPARATUS

INCORPORATION BY REFERENCE

The disclosure of Japanese Patent Application No. 2018-093986 filed on May 15, 2018 including the specification, drawings and abstract, is incorporated herein by reference in its entirety.

BACKGROUND OF THE INVENTION

1. Field of the Invention

The invention relates to a vehicle control apparatus.

2. Description of Related Art

A steering control apparatus that controls a motor which is a source of an assist torque applied to a steering mechanism of a vehicle is conventionally known, as described in Japanese Patent Application Publication No. 2017-24556 (JP 2017-24556 A), for example. The steering control apparatus includes a control circuit (microcomputer) and a rotation monitoring circuit. The control circuit calculates a base value of a torque to be generated by the motor based on a steering torque and a vehicle speed, and sets a target steered angle of steered wheels based on a sum of the calculated base value and a steering torque detected via a torque sensor. The control circuit calculates a correction for the base value through feedback control that brings the steered angle of the steered wheels calculated based on the number of rotations of the motor to the target steered angle, and calculates a torque command value for the motor by adding the calculated correction to the base value. The control circuit controls power supplied to the motor through an inverter so that the torque of the motor is controlled to achieve the torque command value. The torque of the motor is transmitted to a steered shaft via a reduction mechanism.

In the steering control apparatus, power supply to the control circuit is cut off when an ignition switch is turned off. However, there may be a case where a steering wheel is rotated by some kind of external force, causing the steered wheels to turn even when power supply to the control circuit is cut off. For this reason, it is required to monitor the steered angle and the number of rotations of the motor even when the ignition switch is turned off. However, when power supply to the control circuit is cut off, the control circuit is unable to obtain the number of rotations of the motor. Hence, a rotation monitoring circuit is provided in the steering control apparatus. Power is supplied to the rotation monitoring circuit even when the ignition switch is turned off. The rotation monitoring circuit detects the number of rotations of the motor even when the ignition switch is turned off. When the ignition switch is turned on from an off state, the control circuit can obtain a correct value of the steered angle by correcting a value of the steered angle obtained immediately before power supply to the control circuit is cut off, using the number of rotations of the motor detected in the period when the ignition switch is turned off.

Incorporating a self-inspection function in the rotation monitoring circuit has been studied in recent years to meet functional safety requirements for such a steering control apparatus. When the self-inspection function is performed, however, the function of monitoring rotation of the motor in the rotation monitoring circuit is stopped since a logic circuit of the rotation monitoring circuit is inspected. The rotation monitoring circuit operates irrespective of whether the ignition switch is turned on or turned off. Hence, there is a demand for setting an appropriate timing for performing the self-inspection function taking into account an operating state of the rotation monitoring circuit or an operating state of the control circuit.

SUMMARY OF THE INVENTION

An object of the invention is to provide a vehicle control apparatus capable of performing a self-inspection at an appropriate timing.

A vehicle control apparatus according to an aspect of the invention includes a first circuit, a second circuit, and a third circuit. The first circuit is continuously supplied with power and detects a state variable of a detection subject. The second circuit is started upon start of vehicle power supply and performs a specific process using the state variable detected by the first circuit. The third circuit performs an inspection of the first circuit before the second circuit is started.

According to the above aspect, the third circuit performs the inspection of the first circuit before the second circuit is started. This allows for meeting functional safety requirements for the vehicle control apparatus. Meanwhile, when the first circuit is inspected by the third circuit, the first circuit is functionally stopped. Therefore, the inspection of the first circuit cannot be performed when the second circuit is in operation. Accordingly, provided that the first circuit is continuously supplied with power, the third circuit may perform the inspection in a period before the second circuit is started. Thus, the vehicle control apparatus performs the self-inspection at an appropriate timing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
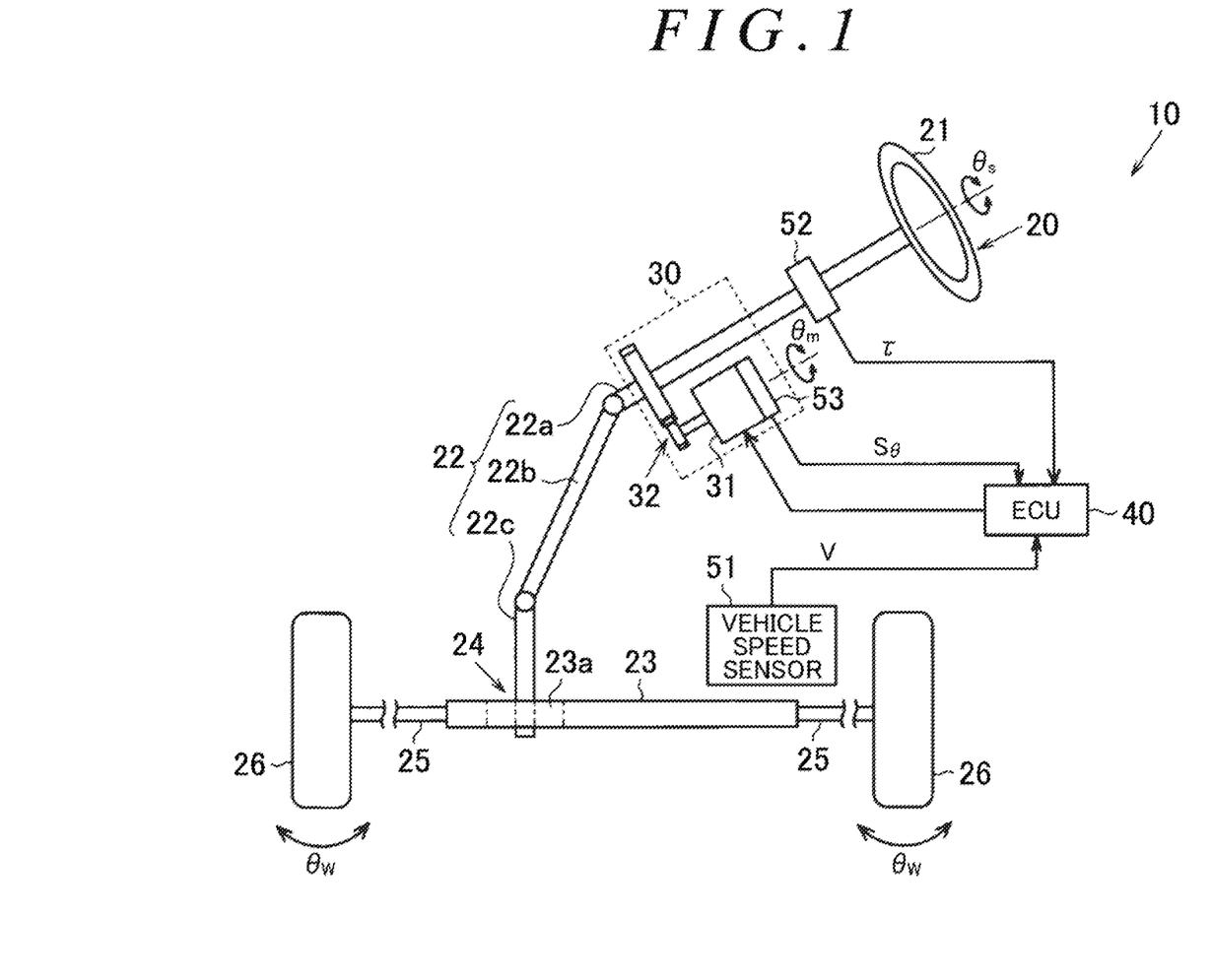
FIG. 1 is a diagram illustrating a schematic configuration of an electric power steering system, in which a vehicle control apparatus according to an embodiment of the invention is mounted.

A vehicle control apparatus according to an embodiment of the invention embodied as an electronic control unit (ECU) of an electric power steering system (hereinafter, referred to as "EPS") is described below. As illustrated in FIG. 1, an EPS 10 includes a steering mechanism 20 that steers steered wheels based on a driver's steering operation, a steering assist mechanism 30 that assists the driver's steering operation, and an ECU 40 that controls actuation of the steering assist mechanism 30.

The steering mechanism 20 includes a steering wheel 21 that is operated by a driver and a steering shaft 22 that rotates integrally with the steering wheel 21. The steering shaft 22 includes a column shaft 22a connected to the steering wheel 21, an intermediate shaft 22b connected to a lower end portion of the column shaft 22a, and a pinion shaft 22c connected to a lower end portion of the intermediate shaft 22b. A lower end portion of the pinion shaft 22c is meshed with a rack shaft 23 (more specifically, a portion 23a where a rack tooth is provided) extending in a direction intersecting the pinion shaft 22c. Hence, a rotating motion of the steering shaft 22 is converted into a reciprocating linear motion of the rack shaft 23 via a rack-and-pinion mechanism 24 including the pinion shaft 22c and the rack shaft 23. The reciprocating linear motion is transmitted to a right steered wheel 26 and a left steered wheel 26, each via a corresponding one of tie rods 25, each of which is coupled to a corresponding one of opposite ends of the rack shaft 23, to thus change a steered angle θw of the steered wheels 26.

The steering assist mechanism 30 includes a motor 31 that is a source of a steering assist force (assist force). As the motor 31, for example, a three-phase brushless motor may be employed. The motor 31 is coupled to the column shaft 22a via a reduction mechanism 32. The reduction mechanism 32 reduces a speed of rotation of the motor 31 and transmits a rotating force of the reduced speed to the column shaft 22a. Thus, a torque of the motor 31 is applied to the steering shaft 22 as a steering assist force to assist the driver's steering operation.

The ECU 40 obtains detection results of various sensors provided in the vehicle as information (state variables) indicating a driver's demand, a running state, and a steering state and controls the motor 31 in accordance with the various pieces of information obtained. Examples of the sensors include a vehicle speed sensor 51, a torque sensor 52, and a rotation angle sensor 53. The vehicle speed sensor 51 detects a vehicle speed (running speed of the vehicle) V. The torque sensor 52 is provided on, for example, the column shaft 22a. The torque sensor 52 detects a steering torque τ applied to the steering shaft 22. The rotation angle sensor 53 is provided on the motor 31. The rotation angle sensor 53 generates an electrical signal $S_\theta$ in accordance with a rotation angle $\theta_m$ of the motor 31.

The ECU 40 detects the rotation angle $\theta_m$ of the motor 31 based on the electrical signal $S_\theta$ generated by the rotation angle sensor 53 and performs vector control of the motor 31 using the detected rotation angle $\theta_m$. The ECU 40 also calculates a steering angle $\theta_s$, which is an angle of rotation of the steering wheel 21, based on the rotation angle $\theta_m$ of the motor 31. The ECU 40 calculates a target assist torque based on the steering torque τ, the vehicle speed V, and the steering angle $\theta_s$ and supplies the motor 31 with driving power for causing the steering assist mechanism 30 to generate the calculated target assist torque.

Figure 2:
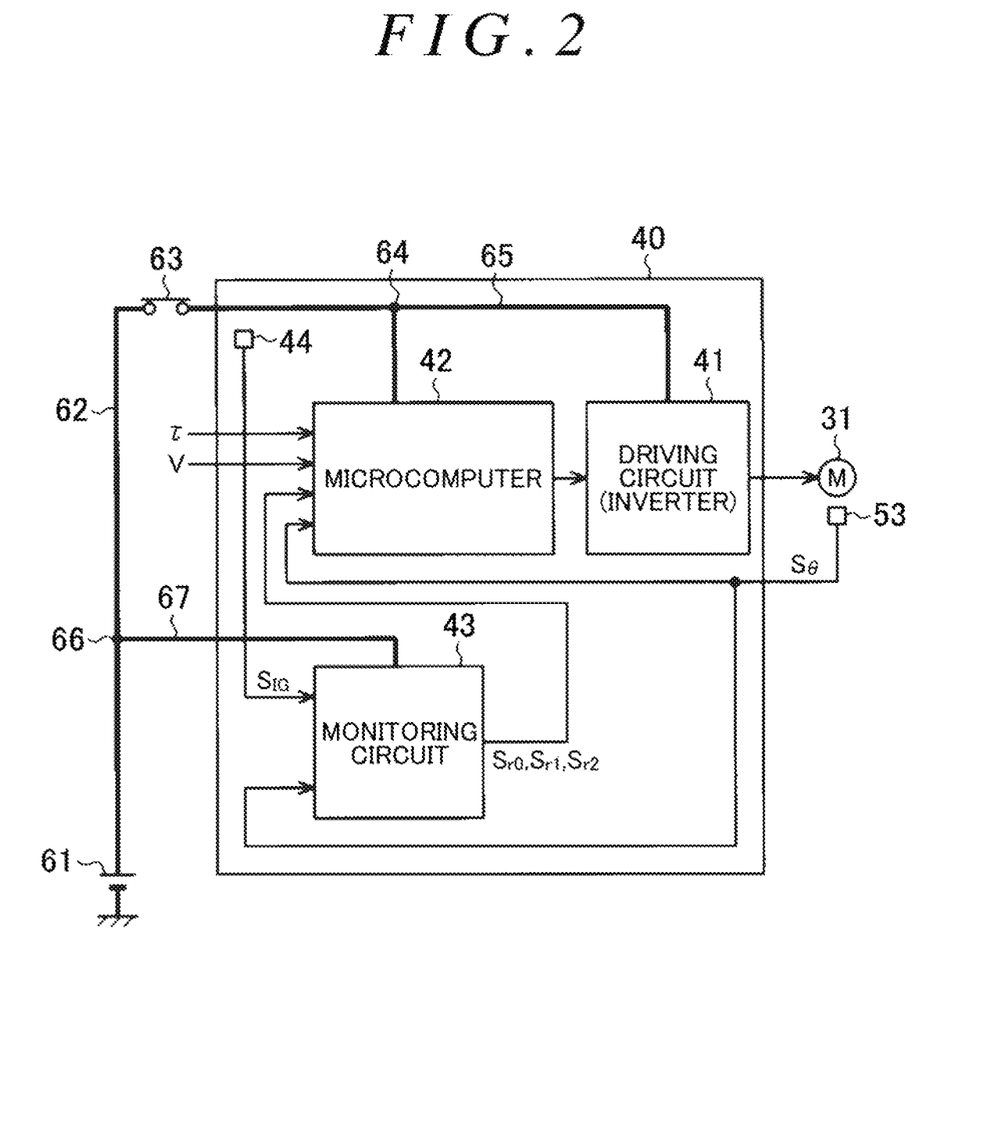
FIG. 2 is a block diagram of the vehicle control apparatus according to the embodiment.

As illustrated in FIG. 2, the ECU 40 includes a driving circuit (inverter) 41, a microcomputer 42, a monitoring circuit 43, and a supply detection circuit 44.

A direct-current (DC) power supply 61, which may be a battery, for example, mounted in the vehicle supplies electric power to each of the driving circuit 41, the microcomputer 42, and the monitoring circuit 43. The microcomputer 42 and the DC power supply 61 (more specifically, a positive terminal of the DC power supply 61) are connected by a first feeder 62. A power switch 63, which may be an ignition switch, for example, of the vehicle is provided on the first feeder 62. The power switch 63 is operated to actuate a drive source (e.g., an engine) to cause the vehicle to travel. A first junction point 64 is provided on the first feeder 62 between the power switch 63 and the microcomputer 42. The first junction point 64 and the driving circuit 41 are connected by a second feeder 65. A second junction point 66 is provided on the first feeder 62 between the DC power supply 61 and the power switch 63. The second junction point 66 and the monitoring circuit 43 are connected by a third feeder 67. When the power switch 63 is turned on, power from the DC power supply 61 is supplied to the microcomputer 42 through the first feeder 62 and also to the driving circuit 41 through the second feeder 65. Power from the DC power supply 61 is supplied to the monitoring circuit 43 through the third feeder 67. Power from the DC power supply 61 is supplied to the rotation angle sensor 53 through a feeder (not illustrated).

The driving circuit 41 is a pulse width modulation (PWM) inverter formed by connecting three legs in parallel, each of which is a leg that serves as a basic unit formed by connecting two switching devices such as field-effect transistors (FETs) in series, with each leg corresponding to one of the three phases (U, V, and W). The driving circuit 41 converts DC power supplied from the DC power supply 61 into three-phase alternating-current (AC) power based on a control signal generated by the microcomputer 42. The three-phase AC power is supplied to the motor 31 (more specifically, to motor coils of the respective phases) through feeder paths (not illustrated) of the respective phases.

The microcomputer 42 calculates a basic component of the target assist torque to be generated by the motor 31 based on the steering torque τ and the vehicle speed V. The microcomputer 42 calculates the rotation angle $\theta_m$ of the motor 31 based on the electrical signal $S_\theta$ generated by the rotation angle sensor 53 and calculates the steering angle $\theta_s$ based on the calculated rotation angle $\theta_m$. The microcomputer 42 calculates, as a part of compensation control of the basic component of the target assist torque, various compensation components based on the calculated steering angle $\theta_s$. The compensation components include, for example, a steering-wheel-return control component for returning the steering wheel 21 to its neutral position. The microcomputer 42 calculates an electric-current command value in accordance with a final target assist torque obtained by adding the basic component of the target assist torque and the various compensation components. The microcomputer 42 generates a control signal for the driving circuit 41 by performing current feedback control that causes an actual current value supplied to the motor 31 to follow the electric-current command value. The control signal defines an on-duty ratio (duty ratio) of each switching device of the driving circuit 41. The on-duty ratio denotes a ratio of an on period of the switching device to a pulse cycle.

Meanwhile, the actual current value supplied to the motor 31 is detected through a current sensor (not illustrated) provided on a feeder path between the driving circuit 41 and the motor 31. Current according to the control signal is supplied to the motor 31 through the driving circuit 41, causing the motor 31 to generate a torque in accordance with the target assist torque. The torque of the motor 31 is applied to the steering mechanism 20 (in the embodiment, the column shaft 22a) of the vehicle via the reduction mechanism 32 as an assist force that assists the driver's steering operation.

The monitoring circuit 43 calculates the number of rotations of the motor 31 based on the electrical signal $S_\theta$ generated by the rotation angle sensor 53. The monitoring circuit 43 is embodied as an Application Specific Integrated Circuit (ASIC). The monitoring circuit 43 is detailed later.

The supply detection circuit 44 detects whether the power switch 63 is in an on state (vehicle power supply: on) or in an off state (vehicle power supply: off). The supply detection circuit 44 may detect the state of the power switch 63 based on a position of the power switch 63 (vehicle power supply) or, alternatively, may detect the state of the power switch 63 based on a voltage of the first feeder 62 between the power switch 63 and the microcomputer 42. The supply detection circuit 44 generates an electrical signal $S_{IG}$ that indicates whether the power switch 63 is in the on state or in the off state.

A process for detecting the steering angle $\theta_s$ is detailed below. A magnetoresistive sensor (MR sensor), which is one type of magnetic sensors, may be employed as the rotation angle sensor 53, for example. The MR sensor generates the electrical signal $S_\theta$ in accordance with a direction of a magnetic field of a bias magnet provided at an end portion of an output shaft of the motor 31 and having one pair of magnetic poles (an N pole and an S pole). The electrical signal $S_\theta$ contains a sine signal that varies sinusoidally with the rotation angle $\theta_m$ of the motor 31 and a cosine signal that varies in a cosinusoidal manner with the rotation angle $\theta_m$ of the motor 31. Each of the sine signal and the cosine signal is a signal, one cycle of which is a period, over which the motor 31 rotates an angle (in the present embodiment, 360°) corresponding to the one magnetic pole pair of the bias magnet. The microcomputer 42 detects the rotation angle $\theta_m$ of the motor 31 by calculating an arc tangent of the sine signal and the cosine signal.

It should be noted that the rotation angle $\theta_m$ of the motor 31 calculated based on the electrical signal $S_\theta$ (the sine signal and the cosine signal) generated by the rotation angle sensor 53 is a relative angle. By contrast, the steering angle $\theta_s$ used in, for example, the steering-wheel-return control is an absolute angle. Hence, the microcomputer 42 calculates the steering angle $\theta_s$ as an absolute value by, for example, applying the rotation angle $\theta_m$ (electrical angle) of the motor 31 to Equation (A) below.

$$\text{Steering angle (absolute angle) } \theta_s = (\theta_m + N \times 360°)/Gr \qquad (A)$$

In Equation (A), N is the number of rotations (the number of cycles), where one rotation is defined as one cycle of the rotation angle $\theta_m$, or, in other words, one cycle in which the electrical angle changes from 0° to 360°. The number of rotations N is obtained through the monitoring circuit 43. Gr is a gear ratio (reduction gear ratio) of the reduction mechanism 32 that reduces a rotation speed of the motor 31. Information indicating the gear ratio Gr is stored in a storage device (not illustrated) of the microcomputer 42.

When the power switch 63 is turned off, the microcomputer 42 stores the rotation angle $\theta_m$ of the motor 31 and the number of rotations N obtained through the monitoring circuit 43, which are obtained immediately before the turning-off of the power switch 63, in the storage device (not illustrated). This is performed so that an accurate value of the steering angle $\theta_s$ can be calculated when the power switch 63 is turned on again.

Nevertheless, the steering wheel 21 may be operated for some reason when the power switch 63 is turned off. In such a case, due to disparity between the value of the rotation angle $\theta_m$ and the value of the number of rotations N of the motor 31 stored in the storage device immediately before cut-off of power supply to the microcomputer 42 and an actual value of the rotation angle $\theta_m$ and an actual value of the number of rotations N, an accurate value of the steering angle $\theta_s$ may not be obtained when the power switch is turned on again. In this view, it is preferable to monitor the number of rotations N of the motor 31 even when the power switch 63 is turned off.

Hence, in the embodiment, even when the power switch 63 is turned off, power supply to the rotation angle sensor 53 and to the monitoring circuit 43 is continued so that the number of rotations N of the motor 31 is continuously counted. The monitoring circuit 43 is required to have a self-inspection function to detect abnormal conditions to achieve reliable detection of the number of rotations N. This is because when the power switch 63 is turned off, power supply to the microcomputer 42 is cut off to reduce consumption (power consumption) of the DC power supply 61. The monitoring circuit 43 is specifically configured as follows.

Figure 3:
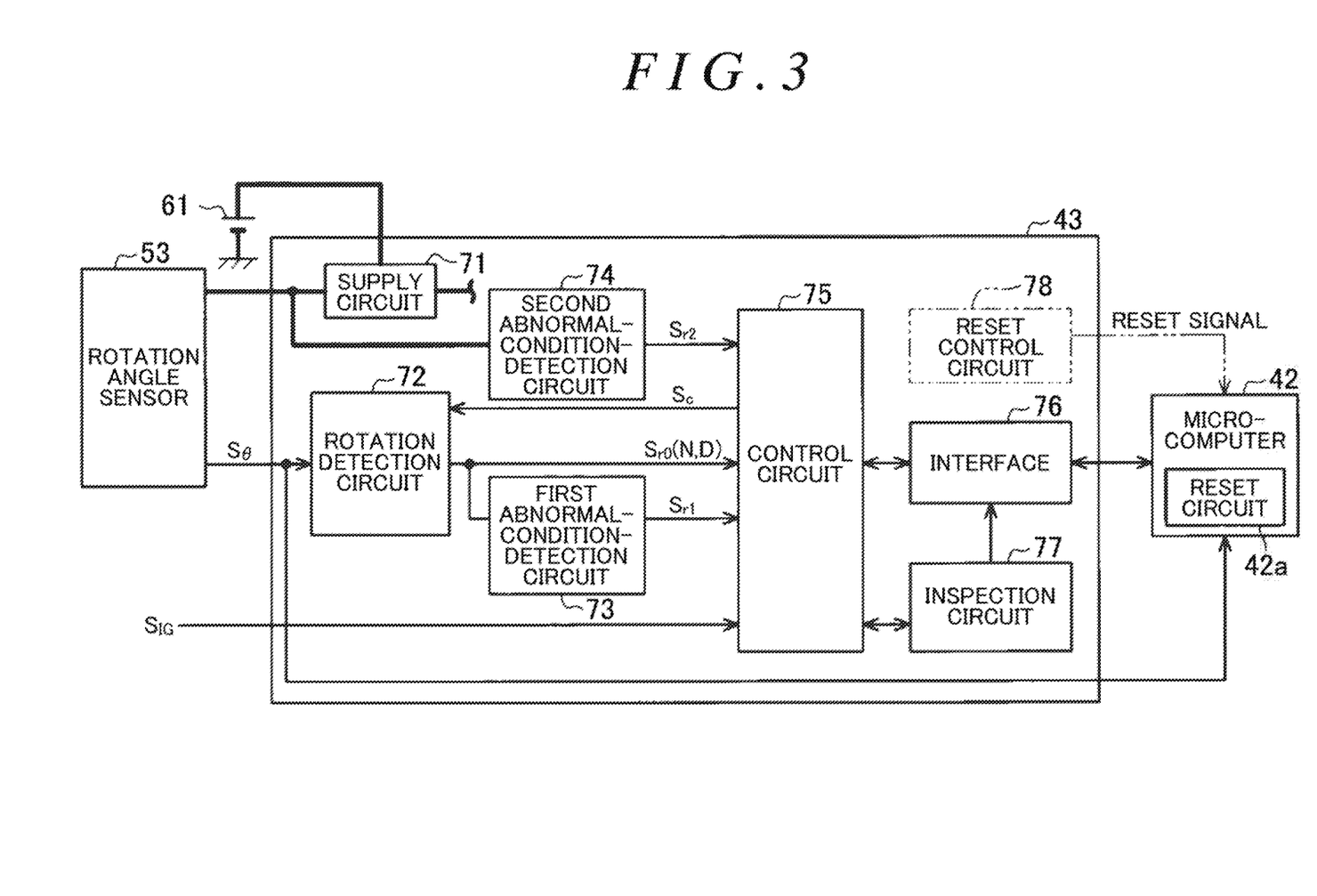
FIG. 3 is a block diagram of a monitoring circuit in the vehicle control apparatus according to the embodiment.

As illustrated in FIG. 3, the monitoring circuit 43 includes a supply circuit 71, a rotation detection circuit 72, a first abnormal-condition-detection circuit 73, a second abnormal-condition-detection circuit 74, a control circuit 75, and an interface 76.

The supply circuit 71 converts power supplied from the DC power supply 61 into power suitable for operations of the components (72, 73, 74, 75, and 76) of the monitoring circuit 43, the rotation angle sensor 53, and other electric circuit(s) (not illustrated). The other electric circuit(s) may include a component that is used or operates when the power switch 63 is turned on, such as the torque sensor 52.

The rotation detection circuit 72 acquires the sine signal and the cosine signal, which are the electrical signals $S_O$, generated by the rotation angle sensor 53 at a preset sampling interval and calculates a rotation direction D and the number of rotations N of the motor 31 based on the acquired sine signal and cosine signal. The rotation detection circuit 72 generates a rotation detection signal $S_{rO}$ containing the rotation direction D and the number of rotations N of the motor 31.

The rotation detection circuit 72 detects the rotation direction D of the motor 31 as follows. The rotation detection circuit 72 plots coordinates (cos $\theta_m$, sin $\theta_m$), which are a pair of the sine signal and the cosine signal, on a Cartesian coordinate system of cos $\theta_m$ and sin $\theta_m$ and detects the rotation direction D of the motor 31 based on transition of a quadrant where the plotted coordinates reside. Meanwhile, the rotation detection circuit 72 determines the quadrant where the plotted coordinates reside depending on whether a value of the coordinate for each of sin $\theta_m$ and cos $\theta_m$ is positive or negative. For example, when the coordinates transition from quadrant I to quadrant II, the rotation detection circuit 72 determines that the rotation direction D of the motor 31 is forward. For example, when the coordinates transition from quadrant I to quadrant IV, the rotation detection circuit 72 determines that the rotation direction D of the motor 31 is backward.

The rotation detection circuit 72 detects the number of rotations N of the motor 31 as follows. The rotation detection circuit 72 includes a counter. Each time the quadrant in which the coordinates (cos $\theta_m$, sin $\theta_m$) which are the pair of the sine signal and the cosine signal reside transitions, the rotation detection circuit 72 increments or decrements a count value by a fixed value (a positive natural number, e.g., one or two). When the rotation direction D of the motor 31 is forward, the rotation detection circuit 72 increments the count value by the fixed value each time the coordinates transition to an adjacent quadrant. When the rotation direction D of the motor 31 is backward, the rotation detection circuit 72 decrements the count value by the fixed value each time the coordinates transition to adjacent quadrant. The rotation detection circuit 72 detects the number of rotations N of the motor 31 based on the count value.

The first abnormal-condition-detection circuit 73 detects an abnormal condition of the rotation detection circuit 72. The first abnormal-condition-detection circuit 73 acquires the rotation detection signal $S_{r0}$ generated by the rotation detection circuit 72 and detects the abnormal condition of the rotation detection circuit 72 based on the number of rotations N and the rotation direction D of the motor 31 contained in the acquired rotation detection signal $S_{r0}$. The first abnormal-condition-detection circuit 73 generates a first abnormal-condition-detection signal $S_{r1}$ indicating whether the rotation detection circuit 72 is in a normal condition or in an abnormal condition as a result of the abnormal condition detection of the rotation detection circuit 72.

For example, the first abnormal-condition-detection circuit 73 detects an abnormal condition of the rotation detection circuit 72 on the basis that, when the motor 31 is rotating normally, the coordinates ($\cos\theta_m$, $\sin\theta_m$) plotted on the Cartesian coordinate system transition to an adjacent quadrant for each transition. In other words, the coordinates never transition from one quadrant to a quadrant not adjacent thereto (quadrant that is diagonally opposite from the one quadrant in the Cartesian coordinate system) in one transition. For example, when the motor 31 is rotating forward, coordinates located in quadrant I never transition to quadrant III, skipping quadrant II. Accordingly, if coordinates transition to a quadrant not adjacent thereto, the first abnormal-condition-detection circuit 73 can detect this as an abnormal condition.

The second abnormal-condition-detection circuit 74 detects the abnormal condition of the supply circuit 71. For example, the second abnormal-condition-detection circuit 74 acquires an output voltage of the supply circuit 71 and detects the abnormal condition of the output voltage by comparing the acquired output voltage with a threshold value. The second abnormal-condition-detection circuit 74 generates a second abnormal-condition-detection signal $S_{r2}$ indicating whether the supply circuit 71 is in a normal condition or in an abnormal condition as a result of the abnormal condition detection of the supply circuit 71.

The control circuit 75 acquires the electrical signal $S_{IG}$ generated by the supply detection circuit 44 and determines whether the power switch 63 is in the on state or in the off state based on the acquired electrical signal $S_{IG}$. The control circuit 75 controls operations of the rotation detection circuit 72 depending on a state of the power switch 63. Specifically, the control circuit 75 generates an operation control signal $S_c$ for the rotation detection circuit 72 depending on the state of the power switch 63. The operation control signal $S_c$ is a command signal for causing the rotation detection circuit 72 to operate intermittently at preset sampling intervals. The rotation detection circuit 72 operates according to the operation control signal $S_c$ to thus sample the electrical signal $S_\theta$ generated by the rotation angle sensor 53 at the preset sampling intervals.

The control circuit 75 includes a logic circuit. The control circuit 75 exchanges various pieces of information with the microcomputer 42 via the interface 76. As the interface 76, a Serial Peripheral Interface (SPI) may be employed, for example. The SPI is one type of standards for synchronous serial communications. The control circuit 75 transmits the rotation detection signal $S_{r0}$ generated by the rotation detection circuit 72, the first abnormal-condition-detection signal $S_{r1}$ generated by the first abnormal-condition-detection circuit 73, and the second abnormal-condition-detection signal $S_{r2}$ generated by the second abnormal-condition-detection circuit 74 to the microcomputer 42 via the interface 76.

Operations performed by the microcomputer 42 when a power supply is turned on are described below. When the power switch 63 is turned on, the microcomputer 42 acquires the first abnormal-condition-detection signal $S_{r1}$, which is a result of the abnormal condition detection performed by the first abnormal-condition-detection circuit 73, and the second abnormal-condition-detection signal $S_{r2}$, which is a result of the abnormal condition detection performed by the second abnormal-condition-detection circuit 74. The microcomputer 42 determines whether the rotation detection circuit 72 is in an abnormal condition based on the first abnormal-condition-detection signal $S_{r1}$ and also determines whether the supply circuit 71 is in an abnormal condition based on the second abnormal-condition-detection signal $S_{r2}$. Upon determining that neither of the rotation detection circuit 72 nor the supply circuit 71 is in an abnormal condition, the microcomputer 42 calculates the steering angle $\theta_s$ as an absolute value by taking into account the number of rotations N of the motor 31 in a period when the power switch 63 is turned off.

When the number of rotations N (count value) in the period when the power switch 63 is turned off is known, the rotation angle $\theta_m$ of the motor 31 in a period from when the power switch 63 is turned off last time to when the power switch 63 is turned on this time can be obtained. When the power switch 63 is turned off and thereafter the power switch 63 is turned on, the microcomputer 42 detects a current value of the rotation angle $\theta_m$ by adding a rotation angle (angle change) of the motor 31 of the period when the power switch 63 is turned off to the rotation angle $\theta_m$ (relative angle) stored when the power switch 63 is turned off last time. The microcomputer 42 calculates the steering angle (absolute angle) $\theta_s$ using the current value of the steering angle $\theta_m$. The microcomputer 42 then controls power supply to the motor 31 using the current value of the steering angle $\theta_m$ of the motor 31. Furthermore, the microcomputer 42 performs compensation control, such as the steering-wheel-return control, using the steering angle $\theta_s$.

Upon determining that at least one of the rotation detection circuit 72 and the supply circuit 71 is in an abnormal condition, the microcomputer 42 invalidates the number of rotations N in the period when the power switch 63 is turned off, for example. This is because the number of rotations N of the motor 31 calculated by the rotation detection circuit 72 is unreliable not only when the rotation detection circuit 72 is detected as being in an abnormal condition but also when the rotation detection circuit 72 operates based on power supplied from the supply circuit 71 that is detected as being in an abnormal condition. Hence, the microcomputer 42 does not use the number of rotations N detected by the rotation detection circuit 72 until it is determined that neither of the rotation detection circuit 72 nor the supply circuit 71 is in an abnormal condition. This reduces occurrence of a situation in which an incorrect value of the steering angle (absolute angle) $\theta_s$ is calculated based on the number of rotations N, which may be incorrect, of the motor 31.

When at least one of the rotation detection circuit 72 and the supply circuit 71 is in an abnormal condition, the microcomputer 42 controls power supply to the motor 31 using the rotation angle $\theta_m$ of the motor 31 detected through the rotation angle sensor 53 without taking into account the number of rotations N in the period when the power switch 63 is turned off. When at least one of the rotation detection circuit 72 and the supply circuit 71 is in an abnormal condition, the microcomputer 42 stops performing compensation control based on the steering angle $\theta_s$, such as the steering-wheel-return control. This is because unless a correct value of the number of rotations N is known, a correct value of the steering angle (absolute angle) $\theta_s$ cannot be calculated and, accordingly, appropriate compensation control cannot be performed. Avoiding compensation control that uses an unreliable value of the steering angle $\theta_s$ can achieve steering control with higher priority on safety.

A self-inspection function is incorporated in the monitoring circuit 43 to meet functional safety requirements for the monitoring circuit 43 and, furthermore, for the ECU 40. The self-inspection function is specifically described below.

As illustrated in FIG. 3, the monitoring circuit 43 includes an inspection circuit 77 that performs an inspection of the control circuit 75. As the inspection circuit 77, a built-in self-test (BIST) circuit may be employed, for example. The inspection circuit 77 includes a circuit that generates a test pattern (pseudo random pattern) for the control circuit 75, which is a subject to inspection, and a circuit that determines a test result. The inspection circuit 77 automatically generates the test pattern and applies the test pattern to the control circuit 75. Subsequently, the inspection circuit 77 acquires a response output from the control circuit 75 as a test result and compares the acquired test result with a predetermined expected value. The inspection circuit 77 determines whether the test result is acceptable or unacceptable based on the comparison result with the expected value and outputs the determination result to the control circuit 75.

When the inspection circuit 77 is inspecting the control circuit 75, not only the control circuit 75 but also the monitoring circuit 43 are functionally stopped. Accordingly, it is required to set a timing of the inspection performed by the inspection circuit 77 taking into account, for example, a condition under which the monitoring circuit 43 is to be operated or an operating state of the microcomputer 42.

Operating states of the microcomputer 42 and the monitoring circuit 43 when the power supply is turned on are described below.

Figure 4:
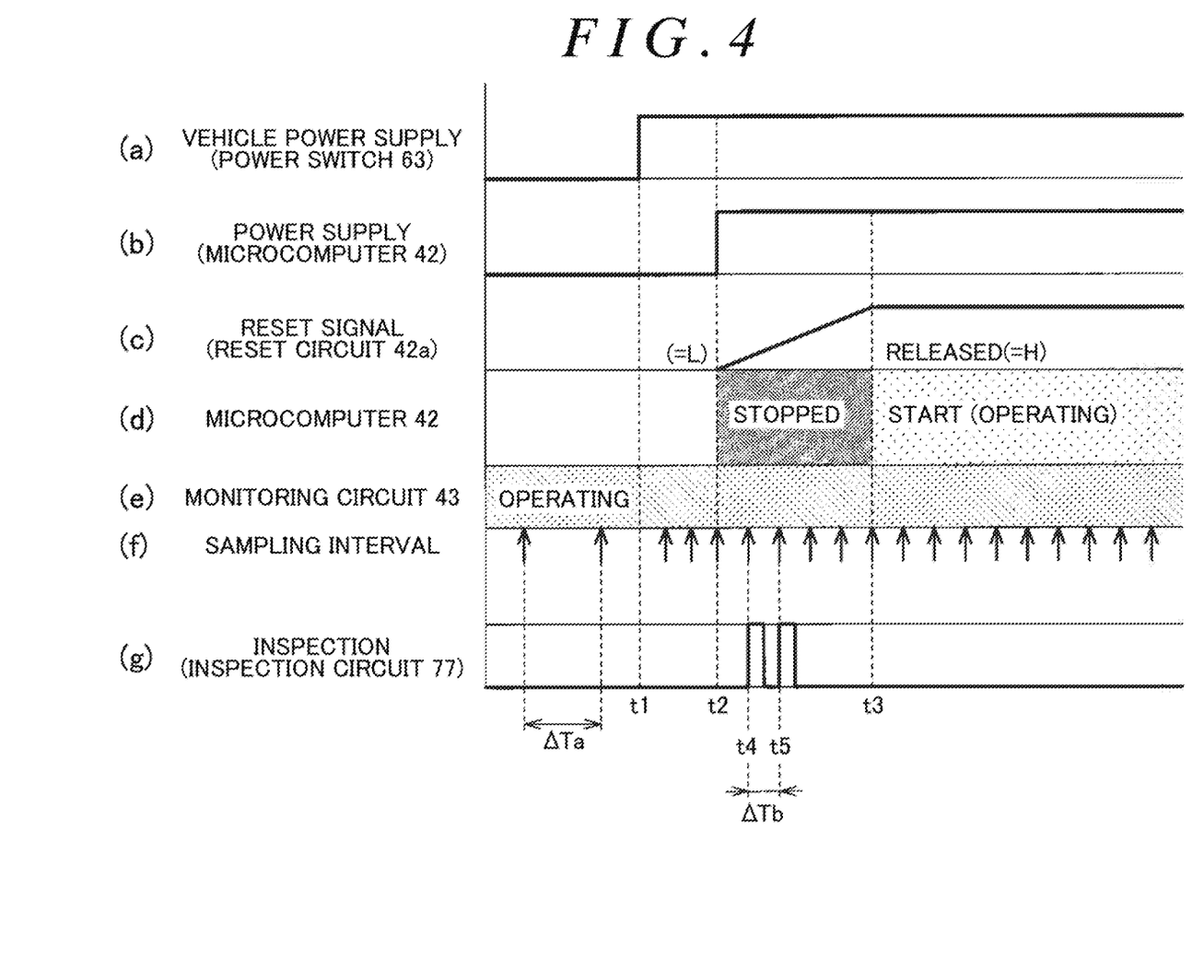
FIG. 4 is a timing diagram for describing when to perform a self-inspection according to the embodiment with graphs (a) to (g).

As illustrated in graphs (a) and (b) in FIG. 4, after a while from turning-on of the power switch 63 (time t1), the power supply of the microcomputer 42 is turned on (time t2). Meanwhile, immediately after the power supply of the microcomputer 42 is turned on, the microcomputer 42 is unstable in its internal state and therefore may not operate normally. For this reason, it is required to reset (initialize) the internal state of the microcomputer 42 when the power supply is turned on so that the microcomputer 42 can start operating normally. Hence, a reset circuit (Power on Reset circuit) 42a (see FIG. 3) is provided in the microcomputer 42.

As illustrated in a graph (c) in FIG. 4, when the power supply of the microcomputer 42 is turned on (time t2), the reset circuit 42a generates a reset signal of a low level (L). The microcomputer 42 is initialized triggered by generation of the reset signal. A signal level (voltage) of the reset signal gradually increases from the low level to a high level (H) with elapse of time. When the low-level reset signal is generated, the microcomputer 42 is kept in a reset state (initialized state).

As illustrated in a graph (d) in FIG. 4, when the low-level reset signal is generated, operations of the microcomputer 42 are stopped. Meanwhile, the low-level reset signal generated by the reset circuit 42a of the microcomputer 42 is acquired by the control circuit 75 of the monitoring circuit 43 via the interface 76. The control circuit 75 can recognize that the reset circuit 42a of the microcomputer 42 is generating the low-level reset signal upon detecting the low-level reset signal.

As illustrated in the graph (c) in FIG. 4, when a supply voltage of the microcomputer 42 has increased beyond a reference voltage to reach a stable state within an operating voltage range (time t3), the reset circuit 42a generates a high-level reset signal. When the signal level of the reset signal is switched from the low level to the high level, the reset state of the microcomputer 42 is released. As illustrated in the graph (d) in FIG. 4, upon being released from the reset state, the microcomputer 42 is started.

As illustrated in a graph (e) in FIG. 4, the monitoring circuit 43 is operated irrespective of the on/off state of the power switch 63 and a power supply state of the microcomputer 42. It should be noted that, as illustrated in a graph (f) in FIG. 4, in a period (preceding time t1) before the power switch 63 is turned on from the off state, including the period when the power switch 63 is turned off, the monitoring circuit 43 acquires the electrical signals $S_\theta$ generated by the rotation angle sensor 53 at a first sampling interval $\Delta Ta$. When the power switch 63 is turned on from the off state (time t1), the monitoring circuit 43 switches the sampling interval for the electrical signals $S_\theta$ generated by the rotation angle sensor 53 from the first sampling interval $\Delta Ta$ to a second sampling interval $\Delta Tb$.

The second sampling interval $\Delta Tb$ is an interval shorter than the first sampling interval $\Delta Ta$. This is because a required level for power consumption reduction when the power switch 63 is turned on is lower than that when the power switch 63 is turned off. For example, when an engine in a gasoline-driven automobile is running, power generated by an alternator is charged to the DC power supply 61. Accordingly, a required level for power consumption reduction when the engine is running is lower than that when the engine is stopped.

The timing of the inspection to be performed by the inspection circuit 77 is described below. The timing of the inspection to be performed by the inspection circuit 77 is determined under the following constraints (B1) to (B3).

(B1) When the inspection circuit 77 performs the inspection of the control circuit 75, not only the control circuit 75 but also the entire monitoring circuit 43 are functionally stopped. Since the microcomputer 42 uses the number of rotations of the motor 31 detected by the monitoring circuit 43, it is difficult for the inspection circuit 77 to perform the inspection after the microcomputer 42 is started (after time t3 in FIG. 4).

(B2) Furthermore, it is required to cause the monitoring circuit 43 to operate irrespective of the on/off state of the power switch 63. For this reason, the inspection circuit 77 must perform the inspection at a timing in which the inspection does not interfere with operations of the monitoring circuit 43.

(B3) In particular, a required level for power consumption reduction when the power switch 63 is turned off is higher than that when the power switch 63 is turned on in view of reducing consumption (power consumption) of the DC power supply 61. Meanwhile, the inspection circuit 77 inspects the control circuit 75 by consuming power from the DC power supply 61. Accordingly, depending on the required level for power consumption reduction when the power switch 63 is turned off, there may be cases where the period when the power switch 63 is turned off is inappropriate as a timing for the inspection circuit 77 to perform the inspection.

Accordingly, the inspection circuit 77 preferably performs the inspection in a period that meets all of the following conditions (C1) to (C3).

(C1) A period before the microcomputer 42 is started (C2) A period when the inspection does not interfere with operations of the monitoring circuit 43

(C3) A period when power consumption by the inspection circuit 77 is unlikely to matter Hence, in the embodiment, a timing when the inspection circuit 77 performs the inspection is set to a period in which the microcomputer 42 is kept in the reset state after the power switch 63 is turned on and which is within the sampling intervals of the monitoring circuit 43.

When the microcomputer 42 is in the reset state, operations of the microcomputer 42 are stopped. Accordingly, the inspection performed by the inspection circuit 77 does not affect the operations of the microcomputer 42. Since the inspection is performed within the sampling intervals of the monitoring circuit 43, the inspection does not interfere with operations of the monitoring circuit 43. Furthermore, since the power switch 63 is turned on, power consumption by the inspection circuit 77 is unlikely to matter.

As illustrated in a graph (g) in FIG. 4, the inspection circuit 77 performs the inspection of the control circuit 75 in a period between time t2 and time t3, in which the microcomputer 42 is kept in the reset state and within the second sampling intervals ΔTb. When the inspection circuit 77 recognizes via the control circuit 75 that the microcomputer 42 is in the reset state, the inspection circuit 77 performs the inspection of the control circuit 75 in a period when the inspection does not coincide with a sampling timing of the rotation detection circuit 72 which is obtained via the control circuit 75. Duration of the inspection performed by the inspection circuit 77 is set to be shorter than the second sampling interval ΔTb.

The inspection circuit 77 may be configured to divide the inspection into several parts depending on contents of the inspection of the control circuit 75 or time required to perform the inspection. The graph (g) in FIG. 4 illustrates an example where the inspection circuit 77 performs the inspection by dividing the inspection into two parts (time t4 and time t5). Duration of the inspection for each part of the inspection is set to be shorter than the second sampling interval ΔTb.

Hence, the embodiment provides effects including the following.

(1) The inspection circuit 77 is incorporated in the monitoring circuit 43 as a self-inspection function. This allows for meeting functional safety requirements for the monitoring circuit 43 and, furthermore, for the ECU 40.

(2) The inspection circuit 77 performs the inspection in a period in which the microcomputer 42 is kept in the reset state after the power switch 63 is turned on and which is within the sampling intervals of the monitoring circuit 43. This allows the inspection circuit 77 to perform the inspection of the control circuit 75 at an appropriate timing without interfering with operations of the microcomputer 42 and operations of the monitoring circuit 43.

(3) The inspection circuit 77 performs the inspection after the power switch 63 is turned on. This can reduce an increase in power consumption of the DC power supply 61 in a period when the power switch 63 is turned off.

The embodiment may be modified as follows. In the embodiment, power to the microcomputer 42 is supplied from the DC power supply 61. Alternatively, power to the microcomputer 42 may be supplied from the supply circuit 71 of the monitoring circuit 43. In this case, the supply circuit 71 preferably has a function of converting power (voltage) supplied from the DC power supply 61 to power (voltage) suitable for operations of the microcomputer 42. The supply circuit 71 supplies power to the microcomputer 42 in a period when the power switch 63 is turned on. The supply circuit 71 may be configured to acquire the electrical signal $S_{IG}$ generated by the supply detection circuit 44 by itself and determine whether the power switch 63 is in the on state or in the off state based on the acquired electrical signal $S_{IG}$. Alternatively, the supply circuit 71 may be configured to acquire a determination result whether the power switch 63 is in the on state or in the off state from the control circuit 75. Further alternatively, the supply circuit 71 may be configured to supply power to the microcomputer 42 according to a power supply command given from the control circuit 75.

In the embodiment, the reset circuit 42a is built in the microcomputer 42. Alternatively, a reset control circuit (reset circuit) 78 may be provided in the monitoring circuit 43 as indicated by a long dashed double-short dashed line in FIG. 3. The reset control circuit 78 monitors the supply voltage of the microcomputer 42. When the monitoring circuit 43 is configured to, for example, supply power from the supply circuit 71 to the microcomputer 42, the reset control circuit 78 may acquire a voltage supplied to the microcomputer 42 from the supply circuit 71.

When the power supply of the microcomputer 42 is turned on (time t2 in FIG. 4), the reset control circuit 78 generates a low-level reset signal. The microcomputer 42 is initialized when the low-level reset signal is supplied to the microcomputer 42 (more specifically, to a reset terminal of the microcomputer 42). The reset control circuit 78 maintains a signal level of the reset signal at the low level for a predetermined period (between time t2 and time t3 in FIG. 4) in which the supply voltage of the microcomputer 42 increases beyond the reference voltage to reach the stable state within the operating voltage range, that is, in which the microcomputer 42 is stable enough to reach an operable state. Thereafter, when the supply voltage of the microcomputer 42 increases beyond the reference voltage to reach the stable state within the operating voltage range (time t3 in FIG. 4), the reset control circuit 78 generates a high-level reset signal. When the signal level of the reset signal is switched from the low level to the high level, the reset state of the microcomputer 42 is released. Hence, the microcomputer 42 starts operating.

The reset control circuit 78 may alternatively be provided in the control circuit 75. When the reset control circuit 78 is provided in the monitoring circuit 43 or the control circuit 75 of the monitoring circuit 43, the microcomputer 42 may be configured such that the reset circuit 42a is omitted therefrom.

An inspection circuit that inspects the first abnormal-condition-detection circuit 73 and the second abnormal-condition-detection circuit 74 may be incorporated in the monitoring circuit 43. An inspection circuit that inspects the microcomputer 42 may be incorporated in the microcomputer 42.

The monitoring circuit 43 may be configured such that at least one of the first abnormal-condition-detection circuit 73 and the second abnormal-condition-detection circuit 74 is omitted therefrom. When the monitoring circuit 43 is configured as such, an abnormal condition(s) of at least one of the rotation detection circuit 72 and the supply circuit 71 is (are) undetectable; however, this configuration allows reduction of power consumption in a period when the power switch 63 is turned off by an amount of power that is required to operate the at least one of the first abnormal-condition-detection circuit 73 and the second abnormal-condition-detection circuit 74.

The steering angle $\theta_s$ (absolute angle) calculated by the microcomputer 42 may be used not only by the EPS 10 but also by a control apparatus of in-vehicle systems other than the EPS 10. Examples of other in-vehicle systems include a vehicle stability control system and a variety of driving assist systems.

The microcomputer 42 is configured to perform compensation control based on the steering angle $\theta_s$ in the embodiment. However, depending on the product specification, etc., the microcomputer 42 may alternatively be configured not to perform compensation control based on the steering angle $\theta_s$. However, even when the microcomputer 42 is configured as such, the ECU 40 or the microcomputer 42 may have a function of calculating the steering angle $\theta_s$. This is because the steering angle $\theta_s$, which is not used by the EPS 10, may be used by in-vehicle systems other than the EPS 10.

Although the inspection circuit 77 that performs the inspection of the control circuit 75 in the monitoring circuit 43 is incorporated in the monitoring circuit 43 in the embodiment, the inspection circuit 77 may alternatively be provided as a separate integrated circuit independent from the monitoring circuit 43.

Detecting the number of rotations of the motor 31 in a period when the power switch 63 is turned off may be unnecessary depending on a specification of the EPS 10. In such a case, the inspection circuit 77 can perform the inspection at a desired timing in a period before the microcomputer 42 is started (preceding time t3 in FIG. 4), including the period when the power switch 63 is turned off.

A monitoring subject (detection subject) of the monitoring circuit 43 is not limited to the motor 31. In the embodiment, as an example of the EPS 10, an EPS of a type that transmits a torque of the motor 31 to (the column shaft 22a of) the steering shaft 22 is employed. Alternatively, the EPS 10 may be of a type that transmits the torque of the motor 31 to the rack shaft 23.

In the embodiment, the vehicle control apparatus is embodied as the ECU 40 of the EPS 10. Alternatively, the vehicle control apparatus may be embodied as a control apparatus of a steer-by-wire (SBW) steering system having a clutch function that connects and disconnects a power transmission path between a steering wheel and steered wheels. A demand similar to that posed on the EPS 10 is posed on the control apparatus in a state where the power transmission path between the steering wheel and the steered wheels is connected. The vehicle control apparatus may be embodied as a control apparatus of an SBW steering system that does not have a power transmission path between a steering wheel and steered wheels.

What is claimed is:

1. A vehicle control apparatus comprising:
a first circuit that is continuously supplied with power and detects a state variable of a detection subject;
a second circuit that is started upon start of vehicle power supply and performs a specific process using the state variable detected by the first circuit; and
a third circuit that performs an inspection of the first circuit only in a time period after the vehicle power supply is supplied to the second circuit and before the second circuit starts operation.

2. The vehicle control apparatus according to claim 1, wherein the third circuit is incorporated in the first circuit.

3. The vehicle control apparatus according to claim 1, wherein
the second circuit has a reset function that initializes an internal state of the second circuit to bring the internal state to a reset state when a power supply is turned on as result of the start of the vehicle power supply, and is started when the power supply is risen to release the reset state of the second circuit, and
the third circuit performs the inspection of the first circuit in a period when the second circuit is in the reset state.

4. The vehicle control apparatus according to claim 1, wherein
the state variable of the detection subject is a state variable that is changeable even when the vehicle power supply is turned off,
the first circuit detects the state variable at a preset sampling interval, and
the third circuit performs the inspection of the first circuit in a period preceding the start of the second circuit and within the sampling interval of the first circuit.

5. The vehicle control apparatus according to claim 1, wherein the third circuit performs the inspection of the first circuit by dividing the inspection into several parts.

6. The vehicle control apparatus according to claim 1, wherein
provided that a motor that is a source of a torque applied to a steering mechanism of a vehicle is the detection subject and that a sensor that generates an electrical signal in accordance with rotation of the motor is mounted in the vehicle,
the first circuit includes a rotation detection circuit that detects the number of rotations of the motor as a change in the state variable based on the electrical signal obtained through the sensor, and a control circuit including a logic circuit that controls an operation of the rotation detection circuit,
the second circuit is a microcomputer that controls the motor depending on a steering state and performs, as the specific process, calculation of an absolute steering angle using a relative rotation angle of the motor calculated based on the electrical signal obtained through the sensor and the number of rotations of the motor obtained through the rotation detection circuit, and
the third circuit performs an inspection of the control circuit of the first circuit.

* * * * *